United States Patent Office 3,700,483
Patented Oct. 24, 1972

3,700,483
PROCESS FOR THE PRODUCTION OF SHEET-FORM BACKING MATERIALS COATED WITH FUSED SYNTHETIC RESINS
Erich Gentsch, Klaus Bederke, and Walter Seider, Wuppertal-Barmen, Hans Jurgen Fullner, Wuppertal-Langerfeld, and Christa Muhlmann, Wuppertal-Barmen, Germany, assignors to Dr. Kurt Herberts & Co. vormals Otto Louis Herberts, Wuppertal-Barmen, Germany
No Drawing. Filed Dec. 11, 1970, Ser. No. 97,316
Claims priority, application Germany, Dec. 12, 1969,
P 19 62 407.8
Int. Cl. B44d 1/44
U.S. Cl. 117—65.2                                          12 Claims

ABSTRACT OF THE DISCLOSURE

There is provided a process for the production of sheet-form substrates coated with fused, catalyst-containing thermosetting synthetic resins, comprising fusing the catalyst-containing thermosetting resin mixture at a temperature of from 70 to 100° C., applying the fused resin in the form of a melt to one side of the substrate and heating the resin-coated substrate at an elevated temperature up to 200° C. and at an elevated pressure up to 15 kp./cm.$^2$ to effect a cure of the resin. The process enables economic production of high-grade plastic coated surfaces with good intermediate storage and molding properties.

---

This invention relates to a process for the production of backing or supporting materials in sheet form coated with fused synthetic resins.

The impregnation and coating of substrates with synthetic resins in dissolved or emulsified form is generally known and practiced on a large scale. Impregnations and surface coatings of this kind based on unsaturated polyester resins are applied for example by brush coating, spraying, dipping, casting and/or roll-coating. In these processes, the resin used for coating is dissolved in solvents or in liquid monomers or, alternatively, is emulsified therein, and the resulting solution or emulsion applied with suitable catalysis. Polymerization is then carried out at room temperature or at moderately elevated temperature in the absence of any pressure using drying tunnels of suitable length.

In another process (Belgian patent specification 549,-984), the liquid polyester resin is applied to a chromium-plated pressure plate and then pressed on to the sheet to be coated under light pressure and heat with or without pregelation. Unfortunately, this so-called "polypress process" has never been successfully applied to practice.

Processes have also been developed for coating surfaces with solvent-free fused synthetic resins( for example the powder process). Unfortunately, the problems involved have never been satisfactorily solved according to existing patents and publications, as demonstrated in the following examples.

DAS 1,297,868 relates to the production of glass-fibre-reinforced plastic sheeting by a process in which endless glass filaments arranged adjacent one another are passed through a liquefied, solvent-free thermosetting synthetic resin and then wrung out to between 20 and 50%. Unfortunately, an unsaturated polyester resin mixture catalyzed with benzoyl peroxide only has a useful life of about 1 hour at 71° C., whilst an epoxide resin mixture can only be kept at a usable viscosity for some 2 to 3 hours at 93° C. For this reason, this process does not lend itself to economic continuous working on account of the very limited useful life of the resin melts.

In addition, it is not possible to impregnate weaker backing materials, for example in the form of non-wovens, because their tear strength is not high enough.

According to Swiss patent application 8,046/66 filed on July 2, 1966 (corresponding to German patent application Sch 4,0793 ViB/75c), the curable synthetic resin mixture is subjected to pre-polymerisation between two heated rollers, is subsequently applied to the surfaces and then cured under heat and pressure. Unfortunately, it is not possible on a commercial scale to obtain a uniform increase in viscosity by the prepolymerisation of catalyzed unsaturated polyesters between heated rollers.

According to German Auslegeschrift No. 1,235,584, the unsaturated polyester resin is fused at an elevated temperature of around 140° C. due to the high melting point of the solid monomers used, namely dimethyl and/or diallyl isocyanurate. It is not possible in this way to add the catalyst to the molten resin bath, and instead the coated sheets have to be catalyzed in a second operation. In addition, the backing material is drawn through the melt and excess resin squeezed off.

The disadvantages of this process are revealed in a paper by Boehme and Deutsch published in "Holztechnologie" 8, No. 4, pp. 263–267 (1967): "New Aspects In the Production of Laminates for the Surface-Finishing of Wooden Materials." According to this process, weakly bonded non-wovens cannot be impregnated whilst catalysis in a second operation casts doubts on the economy of the process.

The processes referred to in the foregoing have only solved partial problems. Nobody has yet solved the problem, as a whole, of economical production using fused resins.

The object of the present invention is to provide an economically feasible process for the continuous coating of backing materials with thermosetting synthetic resins, for example unsaturated polyester resins, in molten form, and also for the rapid but simple molding or pressing of such coated materials to form high-grade plastic surfaces after intermediate storage for periods of any length.

The advantages of a solvent-free coating process are as follows:

(1) Readily processible intermediate products which can be stored for prolonged periods;

(2) The possibility of coating different kinds of flexible and rigid backing materials in the absence of any difficulties;

(3) No danger of fire or explosions during processing in furniture factories etc., such as exists in the case of liquid lacquers;

(4) The absence in the event of interruptions in production of any non-processable residues, as is the case for example with two-component lacquers;

(5) The absence of long production lines;

(6) Simple handling without any need for involved preparatory work;

(7) Limited transportation and storage space in comparison with lacquer containers for reactive lacquers.

An economically satisfactory solution to this problem would therefore afford a very considerable technological advance so far as the manufacturers and consumers are concerned. The problem in question can be solved very largely by the process according to the invention.

The present invention relates to a process for the production of sheet-form backing materials coated with fused, catalyst-containing thermosetting synthetic resins, which process is distinguished by the fact that the catalyst-containing thermosetting resin mixture is fused at 70 to 100° C. and preferably at around 90° C., applied in the form of a melt to one side of the backing materials, and thereafter the backing materials thus coated on one side with the molten resin are hardened at elevated temperatures of up to about 200° C. and under a high pressure of up to about 15 kp./cm.$^2$.

One particularly important feature of the process according to the invention is that the backing material is coated on one side. Coating on one side only makes the molten resin much easier to measure out, and there is no need for squeezing the coated article to remove excess resin. The quantities of synthetic resin to be applied can be regulated very accurately, even in the case of continuous-cycle production, resulting in the formation of a highly uniformly impregnated product. It is surprising that, despite application of the coating to one side only, adequate impregnation is obtained.

An unsaturated polyester in admixture with prepolymerisable monomers is preferably used as the synthetic resin in the process according to the invention. Monomers of this kind include, in particular, high-boiling vinyl-, allyl- and/or acrylic compounds, e.g., diallylphthalate, acrylamide, triallylcyanurate, triallylformate, etc., the same being used in quantities of from 0 to 20%, based on the polymerisable resin. Conventional unsaturated polyester resins as described in German Auslegeschrift No. 1,235,584 are employed.

To enable the process according to the invention to be carried out continuously, even over prolonged periods, in the absence of difficulties, the catalysed thermosetting resin mixture should have a thermal stability at 80° C. of at least 24 hours. Accordingly, in order to obtain the predetermined stability times, the reactivity of the unsaturated polyesters in conjunction with the monomers in the resin formulations should not be too high. In addition, fillers and pigments should not act as accelerators for the peroxidic reaction, as this would only initiate a premature polymerisation reaction. In addition, the peroxide should not undergo any trace decomposition at these temperatures.

The polymerisable synthetic resin preferably has a viscosity of from 7000 to 25,000 cp. as measured 60/40 in cyclohexanone at 25° C.

Although the process, i.e. applying the resin from the melt, can be effectively carried out at very low viscosities, the same is undesirable since the resin becomes too thinly liquid during the subsequent pressing operation conducted under pressure and at temperatures of from 150 to 200° C. In fact, the resin become so fluent that it practically sinks into the carrier plate or runs out of the press despite the hardening process which simultaneously takes place at the elevated temperature.

Where its viscosity is too high, the resin will still be effectively pressed up to a certain upper limit without flowing out during the pressing operation, i.e. the flow-hardening process takes place in such a way that the resin practically remains on the surface, but unfortunately production is substantially impossible with the resin in this form because the fused resin is viscous at the temperature at which it is applied, i.e. around 90° C., that the sheets to be coated tear, split and are unsatisfactorily wetted. Unfortunately, higher production temperatures are not possible because the resin would otherwise harden on the machine itself.

Accordingly, the following viscosities of the molten resin mixtures have proved to be of particular advantage. The figures quoted relate by way of example to the unsaturated polyesters used in the molten resin mixtures:

(a) For clear coating (i.e. coatings of the kind with little or no fillers present in them): approximately 24,000 cp.;

(b) For moderately filled (i.e. containing up to 35% by weight of fillers) or pigmented coatings: approximately 12,000 cp.;

(c) For highly filled (i.e. containing up to 70% by weight of fillers) putty-like coatings: approximately 8000 cp.

These viscosities are each measured 60/40 in cyclohexanone at 25° C.

The particular optimal resin viscosity required can be determined by simple tests. The particular viscosities required can be obtained for example by the following process steps:

(a) By extending the boiling time in the preparation of the unsaturated polyester;

(b) By precrosslinking the unsaturated polyester for example with isocyanates;

(c) By adding pre-polymerised crosslinking agents to the unsaturated polyester, for example β-polymeric diallyl phthalate dissolved in monomeric diallyl phthalate (cf. German Auslegeschrift No. 1,038,759);

(d) By precrosslinking through the brief action of heat on the resin-coated sheets, for example at 130 to 150° C.;

(e) By precrosslinking through the brief irradiation of the resin-coated sheets with electron beams (cf. German patent application P 16 94 392.3) or ultra-violet rays for clear coatings.

The increase in the viscosity of the resin obtained by the process steps described by way of example in the foregoing is particularly suitable for clear, i.e. transparent coating resins, in order for example to allow woodgrains or decorative prints on the underlying layers to show through. To increase viscosity in the case of highly filled synthetic resins, compositions or pressing compositions, it is possible to add even larger quantities of fillers. Other process steps known per se can also be used to increase viscosity. One example of this is the addition of magnesium oxide to prepegs of styrenized unsaturated polyester resins. However, it is not possible in this case, as already mentioned, to obtain clear solutions, and the viscosity does not remain constant.

The catalysts are adapted in known manner to the type and quantity of synthetic resins used. Dicumyl peroxide has proved to be a particularly suitable catalyst for polyester resins, giving a co-ordinated flow-hardening behavior pattern.

Due to the controlled viscosity of the resin in conjunction with the reactivity, the flow of the catalysed resin can be kept within the required limits for use in the production of clear, and also pigmented, pressed surface coatings.

In the present context, the flow-hardening behavior of the resin is the viscosity- and reactivity-dependent flow of the resin under the effect of temperature and pressure until it has hardened completely through polymerisation.

For the purposes of measurement, 1 g. of resin is added, kneaded in substantially spherical form, placed on a horizontally arranged glass plate (8 x 12 cm.) and covered with a piece of polyester film whose surface area is at least equal to that of the glass plate. Flow-hardening is then completed by placing a heatable brass plate with its own weight of 2.5 kg. on the resin for 5 minutes at a temperature of 165° C. ±5° C. The resin hardens over this period.

The surface area of the hardened resin pressing is a quantitative measure of the flow-hardening operation. In the case of clear resins it generally amounts to between 28 and 47 cm.[2] and in the case of pigmented resins to between 7 and 30 cm.[2].

As already mentioned, the catalysed molten resin mass should be storable for at least 24 hours and, if possible, for 72 hours at about 80° C. without gelatinising and without undergoing an excessive increase in viscosity. Thermal stability is required in order to enable production to be carried out continuously at about 80 to 100° C. uniformly and on a relatively wide scale over a prolonged period.

The backing materials can be coated by directly applying the molten resin to one side thereof. It is also possible, however, initially to coat separating films with resin and to allow the backing material to run dry onto the resin surface situated on the separating film. In this way, the resin is transferred from the separating film to the backing material to be coated.

The following specific examples are given as being illustrative only, and while unsaturated polyester resins have been chosen for the exemplified embodiment, it is to be understood that the teachings of the invention apply equally to other conventional thermosetting resins, e.g. epoxides, polyamides, polyethers, modified phenol and melamine resins, silicone rubber, acrylates, polyurethanes, etc.

EXAMPLES

Producing a high viscosity unsaturated polyester 708 g. of neopentyl glycol and 150 g. of 1,2-propylene glycol are heated while stirring to 135° C. in a stream of carbon dioxide. The temperature is then increased to 160° C. over a period of 75 minutes during which 704 g. of isophthalic acid are added in portions. Thereafter, the temperature is increased to 195–200° C. and kept at this level until the acid number amounts to between 9 and 10. The mixture is then cooled to 140° C., followed by the addition of 150 ml. of xylene (as entraining liquid) and 414 g. of maleic acid anhydride. The mixture is then reheated to 195–200° C. and condensed at this temperature until it has an acid number of 28. The entraining liquid is then distilled off in vacuo, followed by re-condensation in vacuo at 190 to 200° C. until the product has a viscosity of for example 22,000 cp. (60/40 in cyclohexanone at 25° C.). It is then cooled to 180° C., stabilised with 0.226 g. of hydroquinone and the hot resin melt discharged by way of a steel cooling belt at 160° C.

FINAL VALUES

Acid number _____ 7–8
Solids content _____percent__ 100
Viscosity _____ ($^1$)

$^1$ 22,000 cp. as measured in the solution phase with 60 parts by weight of unsaturated polyester dissolved in 40 parts by weight of cyclohexanone (in short "measured 60/40") at 25° C. using a Hoeppler viscosimeter.

Preparation of molten resin mixtures

The following molten resin mixtures are prepared with the unsaturated polyester thus prepared:

Clear resin A:

87.1 parts by weight of unsaturated polyester, 2200 cp. (60/40)
8.2 parts by weight of diallyl phthalate
0.1 part by weight of isothymol
2.0 parts by weight of polyethylene glycol derivative
2.6 parts by weight of dicumyl peroxide Clear resin B:

85.6 parts by weight of unsaturated polyester, 2200 cp. (60/40)
8.2 parts by weight of diallyl phthalate
0.1 part by weight of isothymol
0.4 part by weight of UV-absorber
3.0 parts by weight of aluminium oxide
2.6 parts by weight of dicumyl peroxide Pigmented resin, moderately filled:

51.0 parts by weight of unsaturated polyester, 1200 cp. (60/40)
4.0 parts by weight of unsaturated polyester, soft resin
5.5 parts by weight of diallyl phthalate
0.1 part by weight of isothymol
3.6 parts by weight of chloroparaffin 70
12.3 parts by weight of titanium dioxide rutile
4.5 parts by weight of antimony oxide
8.0 parts by weight of kaolin
6.0 parts by weight of aluminium oxide
3.0 parts by weight of zinc stearate
2.0 parts by weight of dicumyl peroxide Pigmented resin, highly filled:

27.8 parts by weight of unsaturated polyester, 8000 cp. (60/40)
4.55 parts by weight of diallyl phthalate
0.05 part by weight of isothymol
2.5 parts by weight of dicyclohexyl phthalate
27.5 parts by weight of titanium dioxide rutile
31.0 parts by weight of Asbestine
3.7 parts by weight of talcum
1.8 parts by weight of zinc stearate
1.1 parts by weight of dicumyl peroxide Preparation of the molten resin mixtures, accompanied by catalysis is carried out in a mixer at around 70 to 90° C.

The homogeneous mass is then either poured into containers for storage and subsequent further processing, in which case the solid fused resin mass is re-liquefied at about 80 to 85° C. before subsequent further processing, or alternatively the mass is introduced into a hinge-mounted container heated to around 80° C. for immediate further processing.

Fused-resin coating

The continuous coating of rigid or flexible substrates such as panels of wood, papers, nonwovens, films, etc. with the fused resin mass is carried out at 70 to 100° C. by means of heated rollers for example.

At the melting temperature which is generally around 90° C. the catalysed fused resin mixture should be liquefied to such an extent that the substrates can be uniformly coated, being almost dry at room temperature. The coating is applied in a quantity of from 50 to 300 g./m.$^2$.

The coated flexible substrates when wound into rolls can be stored for prolonged periods.

The process by which the liquefied synthetic resin can be directly applied to papers or nonwovens for example, as described in the foregoing, can also be modified as follows:

A separating film, for example a cellulose hydrate or polyester film, either matt or glossy, or silicone paper, is coated in exactly the same way as in the foregoing direct coating procedure, and then the desired substrate is allowed to run dry onto the resin layer. This modification has the advantage that the output of the coating machine can be increased, and that the consumer can use the film to which the resin is applied as a separating film during pressing.

Different kinds of papers, wooden panels, etc. are coated as follows with the fused resin mixtures described above, using the process explained in the foregoing:

Decorative papers with a wood-grain finish or self-colored, transparent or printed overlay papers are coated with the resin in a quantity of from about 100 to 200 g. of resin per square meter.

When working according to the "mirror process I," hardened polyester or cellulose hydrate films (acting as separating films) are coated with the melt. The separating film thus coated is then applied cold to fine-wood veneers. This is followed by pressing, as a result of which the fine-wood veneers are given a clear coating. The substrate film can also be removed after the resin has hardened, leaving a self-supporting clear resin film.

When working according to the "mirror process II," a separating film is coated as before by the "mirror process I." Any type of paper is then run in at the same time, and after coating with the resin, is subsequently used for pressing onto panels of wood, accompanied by glueing.

Using the precoated materials it is possible to produce smooth, porous or otherwise embossed surfaces on veneer, Multiplex, joinery, chipboard, hard-fibre panels, etc., including in particular, surface effects which otherwise would be extremely difficult to obtain.

It is also possible directly to coat sheets of veneer with clear fused resin, or inexpensive sheets of wood with pigmented fused resin.

Single-layer laminates of resin-coated decorative papers and uni-papers for coating foam sections, for example (such as polyurethane foam), can also be produced.

PROCESSING, APPLICATION AND PROPERTIES

Pressing data:
    pressure: 5–15 kp./cm.$^2$
    temperature: 140–200° C.
    time: 600–30 seconds in the case of the hot-in-hot process:
    pressing aids: chromium-plated brass panels, silk-smooth or mat; and polyester or cellulose hydrate films, silk-smooth or mat Application: interior lining, door and furniture industry, moulding, industry (for example shaped sitting surfaces)

The qualitative properties of the hardened surfaces are determined by the structure of the unsaturated polyesters or other synthetic resins, the catalysts, the monomers, if any, and pigments and fillers where used.

The fused resin can also be used to coat nonwovens as substrates, for example glass cloths weighting about 40 g./m.$^2$ which are coated, for example, with the clear fused resin mixture B above, or with pigmented resin (moderately filled or highly filled) applied in an average quantity of about 440 g./m.$^2$. The cloth thus impregnated is pressed for example onto plywood boards using chromium-plated pressing panels or polyester films, silicone paper or other separating media.

Panels coated in this way are used for internal and external applications in the building industry. The range of purposes for which they can be used is similar to those described in German patent specifications 969,750; 970,110; 970,857 and 1,008,911.

According to the invention, it is possible to use a panel with a profiled surface as the pressing panel for transmitting the high contact pressure. A panel of this kind with a profiled surface can be for example a natural wood panel. This is possible in the process according to the invention because a relatively low pressure is applied during hardening. In cases were a panel of natural wood is used for pressing, the end product obtained has a surface carrying a negative impression of the panel of wood. This negative impression can in turn be used as the pressing panel in the process according to the invention, in which case an end product is obtained whose surface texture is identical with that of natural wood panel. In cases where a sheet of paper, printed for example with a wood grain, is used as the sheet-form substrate coated on one side with synthetic resin, a strikingly similar imitation of a wood surface is obtained.

It is also possible for the sheet-form substrate coated on one side to be pressed during hardening with a shaped object, for example, in the form of a joinery panel or the like.

What is claimed is:

1. A process for the production of sheet-form substrates coated or impregnated with thermosetting synthetic resins, comprising fusing a curing catalyst-containing thermosetting resin mixture at a temperature of from 70 to 100° C. to a viscosity of from about 7000 to 25,000 cp. (as measured 60/40 in cyclohexane at 25° C.), said fused resin having a thermal stability at 80° C. of at least 24 hours, uniformly applying the fused resin in the form of a melt to one side of the substrate and hardening the resin by subjecting said coated substrate to an elevated temperature from about 140° C. to 200° C. and an to an elevated pressure of from about 5 to 15 kp./cm.$^2$ for a period of time sufficient to effect a cure of the resin.

2. The process of claim 1 wherein the catalyst-containing thermosetting resin is fused at about 90° C.

3. The process of claim 1, wherein the substrate is directly coated with the thermosetting resin.

4. The process of claim 1, wherein said resin application comprises initially coating a separating film and thereafter positioning the substrate on the coated separating film, and wherein after subjecting the coated substrate to said curing conditions, the separating film is removed.

5. The process of claim 1, wherein a panel with a profiled surface is used as a pressing panel for transmitting said elevated pressure.

6. The process of claim 5, wherein the pressing panel is a natural wood panel.

7. The process of claim 5, wherein the pressing panel is a negative print of a natural wood panel.

8. The process of claim 1, wherein the resin-coated sheet form substrate is pressed on its coated side with a shaped object during said curing.

9. The process of claim 1, wherein the catalyst-containing thermosetting resin comprises an unsaturated polyester resin in admixture with up to 20% by weight of a prepolymerisable monomer.

10. The process of claim 9, wherein the prepolymerisable monomer is selected from the group consisting of high-boiling vinyl monomers, allyl monomers, acrylic monomers and mixtures thereof.

11. The process of claim 1, wherein the said process is carried out in a continuous mannner.

12. The process of claim 1, wherein said substrate comprises a non-woven material of low tear strength and said resin is applied in the amount of from about 50 to 300 g./m.$^2$ to a single side thereof, whereby a completely and uniform impregnated product results.

References Cited

UNITED STATES PATENTS

| | | | |
|---|---|---|---|
| 2,273,891 | 2/1942 | Pollack et al. | 117—161 K |
| 2,631,960 | 3/1953 | Dafter | 117—161 K |
| 3,013,914 | 12/1961 | Willard | 117—161 K |
| 2,322,756 | 6/1943 | Walder | 117—161 K |
| 2,271,724 | 2/1942 | Traylor | 117—161 K |

WILLIAM D. MARTIN, Primary Examiner

T. G. DAVIS, Assistant Examiner

U.S. Cl. X.R.

117—10, 120, 138.8 A, 140 R, 148, 155 R,UA, 161 K, P, KP, 161 ZA